US009823525B2

(12) United States Patent
Sung et al.

(10) Patent No.: US 9,823,525 B2
(45) Date of Patent: Nov. 21, 2017

(54) DISPLAY PANELS AND ELECTRONIC DEVICES COMPRISING THE SAME

(71) Applicant: InnoLux Corporation, Miao-Li County (TW)

(72) Inventors: Li-Wei Sung, Miao-Li County (TW); Chung-Yi Wang, Miao-Li County (TW); An-Chang Wang, Miao-Li County (TW); Yao-Lien Hsieh, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 133 days.

(21) Appl. No.: 15/001,346

(22) Filed: Jan. 20, 2016

(65) Prior Publication Data

US 2016/0131949 A1    May 12, 2016

Related U.S. Application Data

(63) Continuation of application No. 13/745,331, filed on Jan. 18, 2013, now Pat. No. 9,274,385.

(30) Foreign Application Priority Data

Jan. 20, 2012 (TW) .............................. 101102435 A

(51) Int. Cl.
*G02F 1/136* (2006.01)
*G02F 1/1343* (2006.01)
*G02F 1/1362* (2006.01)

(52) U.S. Cl.
CPC .. *G02F 1/134336* (2013.01); *G02F 1/136286* (2013.01); *G02F 2001/134318* (2013.01); *G02F 2001/134345* (2013.01)

(58) Field of Classification Search
CPC ... G02F 1/136286; G02F 2001/134345; G02F 2201/122; G02F 2201/52; G09G 3/3648; H01L 27/3211; H01L 27/3244
See application file for complete search history.

(56) References Cited

U.S. PATENT DOCUMENTS 5,563,727 A   10/1996  Larson et al.
5,576,857 A   11/1996  Takemura
(Continued)

FOREIGN PATENT DOCUMENTS

CN   101976007    2/2011
JP   H04140725    5/1992
(Continued)

OTHER PUBLICATIONS

European Search Report for Application No./Patent No. 13151481. 2-1904, dated Apr. 26, 2013.
(Continued)

*Primary Examiner* — Huyen Ngo
(74) *Attorney, Agent, or Firm* — McClure, Qualey & Rodack, LLP

(57) ABSTRACT

A display panel is provided. The display panel includes a first sub-pixel row including a plurality of sub-pixels electrically connecting to a scan line; and a second sub-pixel row including a plurality of sub-pixels, wherein the scan line overlaps with an area of the sub-pixels of the second sub-pixel row, and the scan line overlaps with an edge of a first sub-pixel of the sub-pixels of the first sub-pixel row, wherein the edge is adjacent to a driving transistor of the first sub-pixel.

20 Claims, 5 Drawing Sheets

(56) References Cited

U.S. PATENT DOCUMENTS

| | | |
|---|---|---|
| 5,757,444 A | 5/1998 | Takemura |
| 7,397,455 B2 | 7/2008 | Elliot et al. |
| 8,023,089 B2 | 9/2011 | Yeh et al. |
| 8,035,596 B2 | 10/2011 | Sekine |
| 8,179,350 B2 | 5/2012 | Park |
| 2003/0230763 A1* | 12/2003 | Kimura ............... H01L 27/12 257/200 |
| 2005/0041188 A1 | 2/2005 | Yamazaki |
| 2005/0099378 A1 | 5/2005 | Kim |
| 2006/0050210 A1 | 3/2006 | Tsuchiya |
| 2007/0070093 A1 | 3/2007 | Lin et al. |
| 2012/0033160 A1 | 2/2012 | Tashiro et al. |
| 2013/0155034 A1* | 6/2013 | Nakayama ............ G09F 9/35 345/204 |
| 2017/0184928 A1* | 6/2017 | Tsai ............... G02F 1/134336 |

FOREIGN PATENT DOCUMENTS

| | | |
|---|---|---|
| JP | 05-297405 | 11/1993 |
| JP | H06186575 | 7/1994 |
| JP | H08240812 | 9/1996 |
| TW | 200730923 | 8/2007 |
| WO | WO 96/00926 | 1/1996 |
| WO | WO 2010/113435 | 10/2010 |

OTHER PUBLICATIONS

Office Action dated Feb. 12, 2014, from corresponding application No. JP 2013-007036.

Office Action dated Aug. 20, 2014, from corresponding application No. TW 101102435.

* cited by examiner

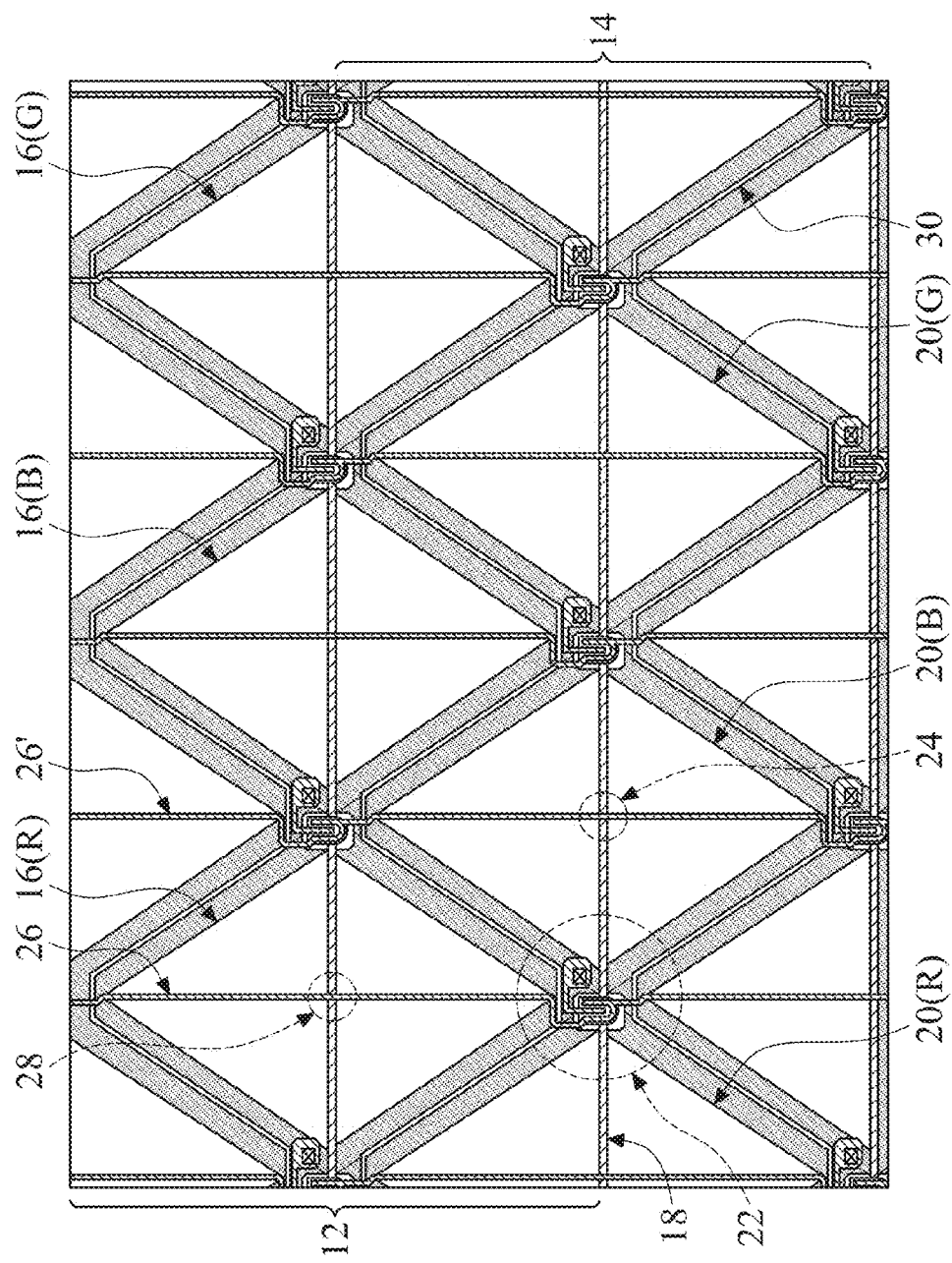

DISPLAY PANELS AND ELECTRONIC DEVICES COMPRISING THE SAME

CROSS REFERENCE TO RELATED APPLICATIONS

This application is a Continuation of pending U.S. patent application Ser. No. 13/745,331, filed on Jan. 18, 2013, and entitled "Display panels and electronic devices comprising the same", which claims priority of Taiwan Patent Application No. 101102435, filed on Jan. 20, 2012, the entirety of which is incorporated by reference herein.

BACKGROUND OF THE INVENTION

Field of the Invention

The disclosure relates to a pixel structure, and in particular to a pixel structure with high light penetration, capable of efficiently controlling feedthrough.

Description of the Related Art

For vertical alignment (VA) wide viewing angle technology, if the efficiency of liquid crystals located at a boundary between two areas with different liquid crystal orientations is unsatisfactory, light penetration of the panels will be poor. Also, when being fabricated, opaque metal lines also cause light penetration of the panels to be poor. Generally speaking, a pixel electrode design can optimize light penetration. For instance, designers try to narrow the area with low liquid crystal efficiency. However, some optical problems come up. For example, excessive capacitive coupling effects which cause crosstalk, or an asymmetrical positive/negative half-cycle voltage which results in fabrication difficulty and decreased yield and product reliability, etc.

"Feedthrough" is a capacitive coupling effect which is produced when a transistor is turned on and then turned off. Voltage is from high to low (taking CMI Corp. for example), therefore, the coupling direction is to pull the pixel electrode voltage downward. Liquid crystals will be driven in a positive/negative half-cycle AC status in order to prevent the liquid crystals from polarization which loses the original characteristics thereof. At this time, if the "feedthrough" is excessively heavy, the symmetry of positive/negative half-cycle will be decreased, resulting in fabrication and optical problems.

BRIEF SUMMARY OF THE INVENTION

One embodiment of the disclosure provides a pixel structure, comprising: a first sub-pixel row comprising a plurality of sub-pixels electrically connecting to a first scan line; and a second sub-pixel row comprising a plurality of sub-pixels, wherein the first scan line passes through an area of the sub-pixels of the second sub-pixel row.

The sub-pixels of the first sub-pixel row and the second sub-pixel row are in a shape of a rectangle, rhombus or polygon.

The sub-pixels of the first sub-pixel row comprise one of red, blue or green pixels or a combination thereof.

The sub-pixels of the second sub-pixel row comprise one of red, blue or green pixels or a combination thereof.

The area of the sub-pixels of the second sub-pixel row where the first scan line passes through, corresponds to a liquid crystal shadow area.

The sub-pixels of the second sub-pixel row are respectively disposed between the sub-pixels of the first sub-pixel row such that the sub-pixels of the first sub-pixel row and the sub-pixels of the second sub-pixel row are in a staggered arrangement.

The pixel structure further comprises a plurality of first data lines passing through an area of the sub-pixels of the first sub-pixel row.

The area of the sub-pixels of the first sub-pixel row where the first data lines pass through, corresponds to a liquid crystal shadow area.

The pixel structure further comprises a plurality of second data lines passing through an area of the sub-pixels of the second sub-pixel row.

The area of the sub-pixels of the second sub-pixel row where the second data lines pass through, corresponds to a liquid crystal shadow area.

The pixel structure further comprises a plurality of common electrodes disposed on the edges of the sub-pixels of the first sub-pixel row and the second sub-pixel row.

The common electrodes are zigzag or concavo-convex.

The first scan line passes through the edges of the sub-pixels of the first sub-pixel row and is vertical to the first data lines.

The first scan line passes through the center of the sub-pixels of the second sub-pixel row.

The pixel structure further comprises a plurality of driving devices, wherein each of the driving devices simultaneously controls one first data line and one second data line.

The pixel structure further comprises a plurality of driving transistors, wherein the driving transistors are electrically connected to the sub-pixels of the first sub-pixel row and disposed between the two adjacent sub-pixels of the second sub-pixel row.

One embodiment of the disclosure provides an electronic device incorporating a display panel, the display panel comprising: a first sub-pixel row comprising a plurality of sub-pixels electrically connecting to a first scan line; and a second sub-pixel row comprising a plurality of sub-pixels, wherein the first scan line passes through an area of the sub-pixels of the second sub-pixel row.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawing, wherein:

FIG. 3A shows a top view of a pixel structure according to an embodiment of the disclosure.

DETAILED DESCRIPTION OF THE INVENTION

Figure 1A:
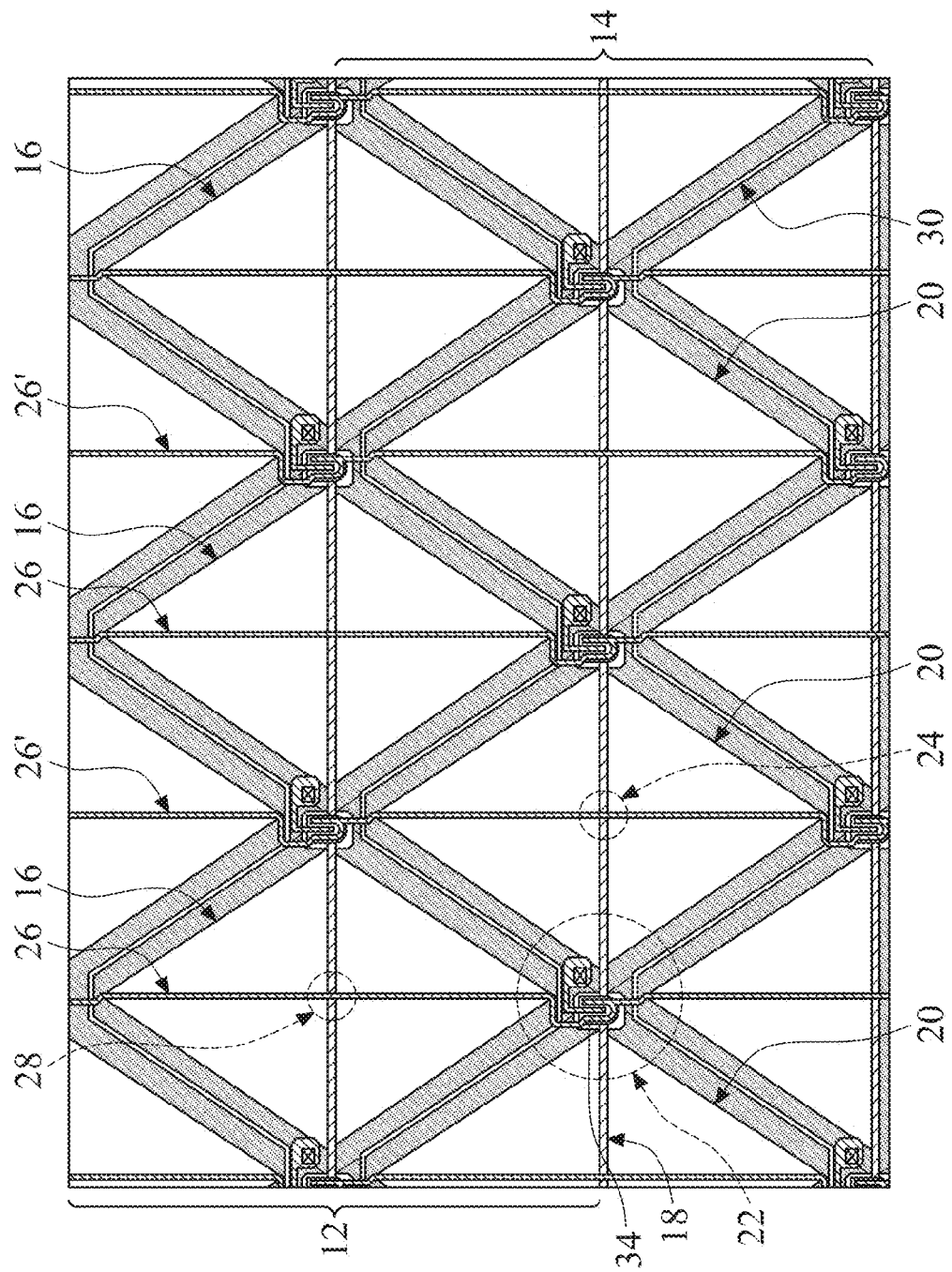
FIG. 1A shows a top view of a pixel structure according to an embodiment of the disclosure.

Referring to FIG. 1A, in accordance with one embodiment of the disclosure, a pixel structure is provided. A pixel structure 10 comprises a first sub-pixel row 12 and a second sub-pixel row 14. The first sub-pixel row 12 comprises a plurality of sub-pixels 16 electrically connecting to a first scan line 18. The second sub-pixel row 14 comprises a plurality of sub-pixels 20. Specifically, the first scan line 18 passes through an area of the sub-pixels 20 of the second sub-pixel row 14, for example the first scan line 18 passes through a center 24 of the sub-pixels 20 of the second sub-pixel row 14.

Figure 1B:
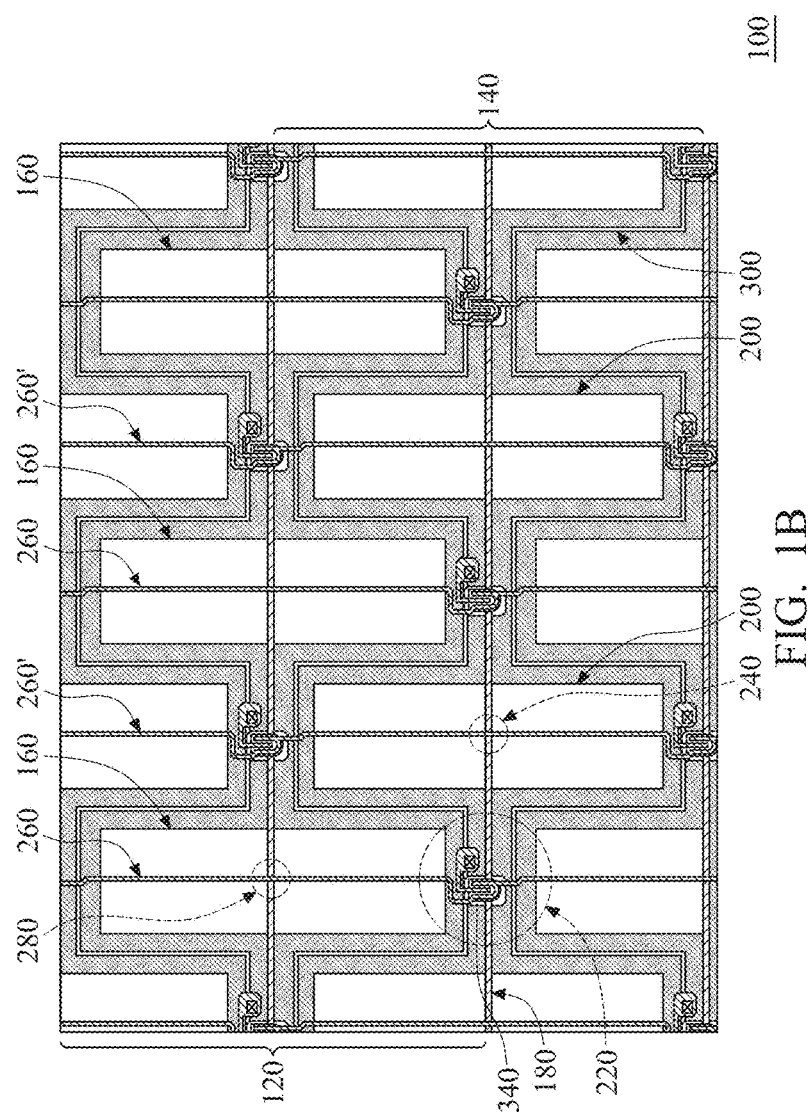
FIG. 1B shows a top view of a pixel structure according to an embodiment of the disclosure.

In this embodiment, the sub-pixels (16, 20) of the first sub-pixel row 12 and the second sub-pixel row 14 are in a shape of a rhombus, but the disclosure is not limited thereto. In other embodiments, the sub-pixels (16, 20) of the first sub-pixel row 12 and the second sub-pixel row 14 may be in a shape of a rectangle or polygon. Referring to FIG. 1B, in accordance with another embodiment of the disclosure, a pixel structure is provided. A pixel structure 100 comprises a first sub-pixel row 120 and a second sub-pixel row 140. The first sub-pixel row 120 comprises a plurality of sub-pixels 160 electrically connected to a first scan line 180. The second sub-pixel row 140 comprises a plurality of sub-pixels 200. Specifically, the first scan line 180 passes through an area of the sub-pixels 200 of the second sub-pixel row 140, for example the first scan line 180 passes through a center 240 of the sub-pixels 200 of the second sub-pixel row 140.

In this embodiment, the sub-pixels (160, 200) of the first sub-pixel row 120 and the second sub-pixel row 140 are in a shape of a rectangle.

Figure 3B:
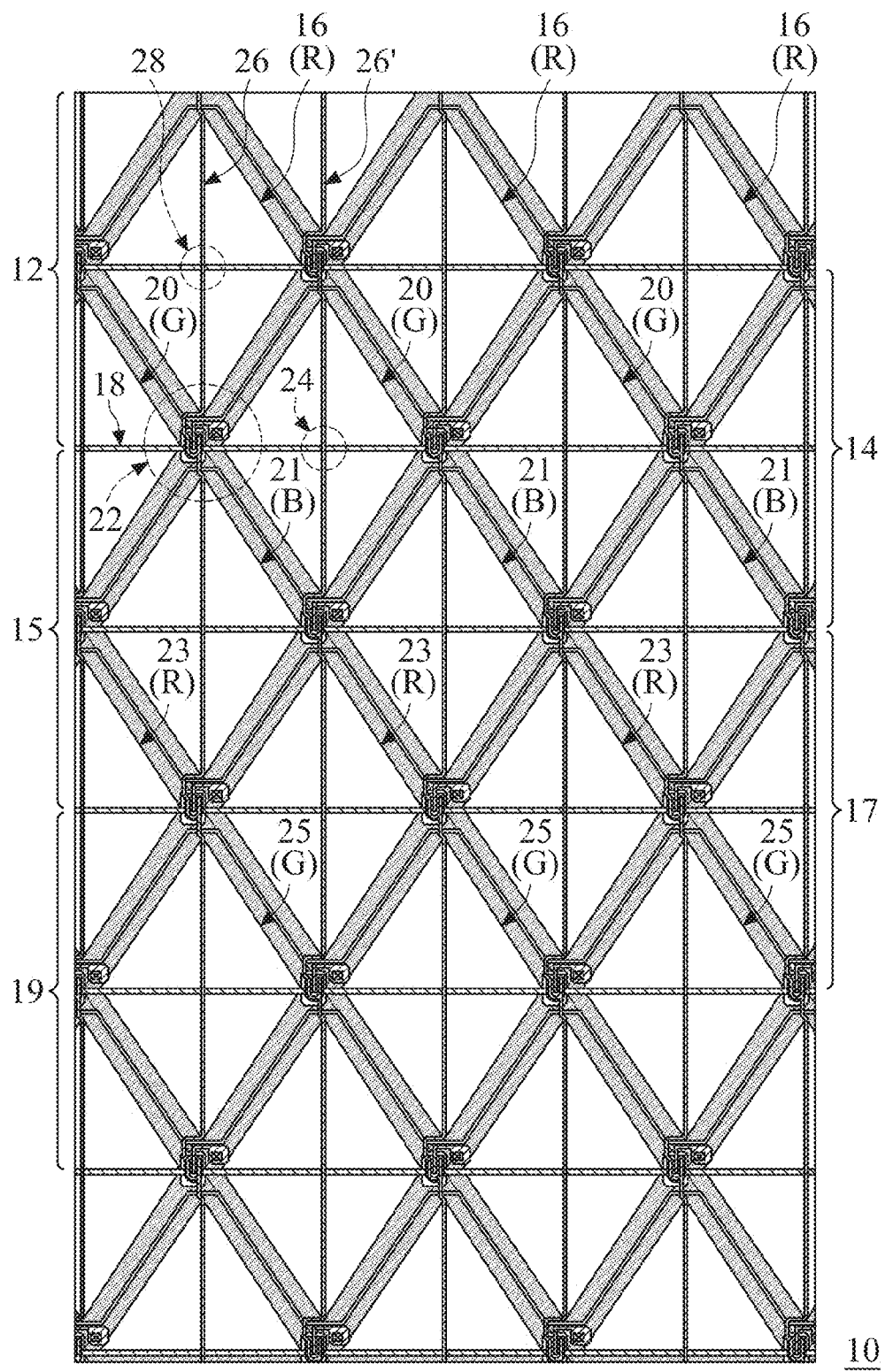
FIG. 3B shows a top view of a pixel structure according to an embodiment of the disclosure.

Next, referring to FIGS. 3A and 3B, the sub-pixels 16 of the first sub-pixel row 12 may comprise a combination of red, blue and green sub-pixels, for example a red sub-pixel R, a blue sub-pixel B and a green sub-pixel G are horizontally arranged, as shown in FIG. 3A. Similarly, the sub-pixels 20 of the second sub-pixel row 14 may also comprise a combination of red, blue and green sub-pixels, for example a red sub-pixel R, a blue sub-pixel B and a green sub-pixel G are horizontally arranged, as shown in FIG. 3A. Additionally, referring to FIG. 3B, the sub-pixels 16 of the first sub-pixel row 12 may also comprise one of red, blue or green sub-pixels, for example red sub-pixels R. The sub-pixels 20 of the second sub-pixel row 14 may also comprise one of red, blue or green sub-pixels, for example green sub-pixels G. Sub-pixels 21 of a third sub-pixel row 15 may also comprise one of red, blue or green sub-pixels, for example blue sub-pixels B. Sub-pixels 23 of a fourth sub-pixel row 17 may comprise one of red, blue or green sub-pixels, for example red sub-pixels R. Sub-pixels 25 of a fifth sub-pixel row 19 may comprise one of red, blue or green sub-pixels, for example green sub-pixels G such that, for example the red sub-pixel 16 (R), the blue sub-pixel 21 (B) and the green sub-pixel 25 (G) are vertically arranged.

Specifically, the area of the sub-pixels 20 of the second sub-pixel row 14 where the first scan line 18 passes through, corresponds to a liquid crystal shadow area. The liquid crystal shadow area is formed by an improper arrangement of liquid crystals located at a boundary between two areas with different liquid crystal orientations under an electric field. Additionally, as shown in FIG. 1A, the sub-pixels 20 of the second sub-pixel row 14 are respectively disposed between the sub-pixels 16 of the first sub-pixel row 12 such that the sub-pixels 16 of the first sub-pixel row 12 and the sub-pixels 20 of the second sub-pixel row 14 are in a staggered arrangement.

Additionally, still referring to FIG. 1A, the pixel structure 10 further comprises a plurality of first data lines 26 passing through an area corresponding to a liquid crystal shadow area of the sub-pixels 16 of the first sub-pixel row 12, for example the first data line 26 passes through a center 28 of the sub-pixels 16 of the first sub-pixel row 12. The pixel structure 10 further comprises a plurality of second data lines 26' passing through an area corresponding to a liquid crystal shadow area of the sub-pixels 20 of the second sub-pixel row 14, for example the second data line 26' passes through the center 24 of the sub-pixels 20 of the second sub-pixel row 14.

Specifically, the first scan line 18 passes through edges 22 of the sub-pixels 16 of the first sub-pixel row 12 and is vertical to the first data lines 26.

The pixel structure 10 further comprises a plurality of common electrodes 30 disposed on the edges of the sub-pixels (16, 20) of the first sub-pixel row 12 and the second sub-pixel row 14, for example the common electrodes 30 are zigzag, as shown in FIG. 1A.

The pixel structure 10 further comprises a plurality of driving transistors 34 electrically connected to the sub-pixels 16 of the first sub-pixel row 12 and disposed between the two adjacent sub-pixels (20, 20) of the second sub-pixel row 14.

In another embodiment, referring to FIG. 1B, the pixel structure 100 further comprises a plurality of first data lines 260 passing through an area corresponding to a liquid crystal shadow area of the sub-pixels 160 of the first sub-pixel row 120, for example the first data line 260 passes through a center 280 of the sub-pixels 160 of the first sub-pixel row 120. The pixel structure 100 further comprises a plurality of second data lines 260' passing through an area corresponding to a liquid crystal shadow area of the sub-pixels 200 of the second sub-pixel row 140, for example the second data line 260' passes through the center 240 of the sub-pixels 200 of the second sub-pixel row 140.

Specifically, the first scan line 180 passes through edges 220 of the sub-pixels 160 of the first sub-pixel row 120 and is vertical to the first data lines 260.

The pixel structure 100 further comprises a plurality of common electrodes 300 disposed on the edges of the sub-pixels (160, 200) of the first sub-pixel row 120 and the second sub-pixel row 140, for example the common electrodes 300 are concavo-convex, as shown in FIG. 1B.

The pixel structure 100 further comprises a plurality of driving transistors 340 electrically connected to the sub-pixels 160 of the first sub-pixel row 120 and disposed between the two adjacent sub-pixels (200, 200) of the second sub-pixel row 140.

Figure 2:
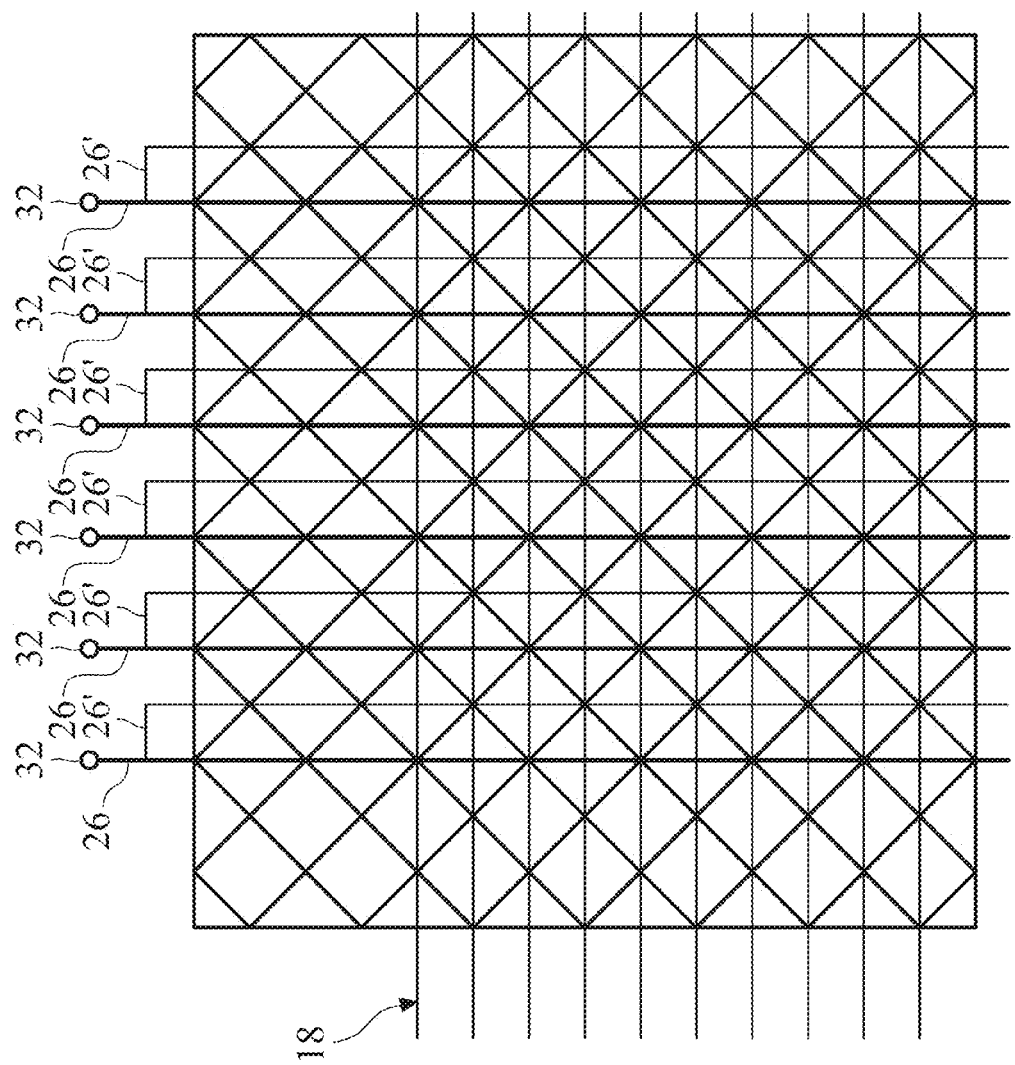
FIG. 2 shows a top view of a pixel structure according to an embodiment of the disclosure.

Additionally, referring to FIG. 2, the pixel structure 10 further comprises a plurality of driving devices 32. Specifically, each of the driving devices 32 simultaneously controls one first data line 26 and one second data line 26'.

In the disclosure, for example a scan line of a first sub-pixel row is buried in an area corresponding to a liquid crystal shadow area of a second sub-pixel row due to a staggered arrangement of adjacent sub-pixels (sub-pixels of different rows). That is, opaque metal lines (for example a scan line and a data line) are combined with the liquid crystal shadow area with low liquid crystal efficiency, maximizing light penetration. Simultaneously, low capacitive coupling effect (feedthrough) remains due to the pixel electrode (ITO) of the second sub-pixel row across the scan line of the first sub-pixel row, significantly reducing conventional side effects produced from light penetration maximization.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display panel, comprising:
   a first sub-pixel row comprising a plurality of sub-pixels electrically connecting to a scan line; and
   a second sub-pixel row comprising a plurality of sub-pixels, wherein the scan line overlaps with an area of the sub-pixels of the second sub-pixel row, and the scan line overlaps with an edge of a first sub-pixel of the sub-pixels of the first sub-pixel row, wherein the edge is adjacent to a driving transistor of the first sub-pixel.

2. The display panel as claimed in claim 1, wherein the scan line overlaps with an area of a pixel electrode of the sub-pixels of the second sub-pixel row.

3. The display panel as claimed in claim 2, wherein the scan line overlaps with an edge of a pixel electrode of the first sub-pixel.

4. The display panel as claimed in claim 1, wherein the sub-pixels of the first sub-pixel row and the second sub-pixel row are in a shape of a rectangle, rhombus or polygon.

5. The display panel as claimed in claim 1, wherein the sub-pixels of the first sub-pixel row and the second sub-pixel row comprise one of red, blue or green sub-pixels or a combination thereof.

6. The display panel as claimed in claim 1, wherein the area of the sub-pixels of the second sub-pixel row where the scan line overlaps with, corresponds to a liquid crystal shadow area.

7. The display panel as claimed in claim 1, wherein the sub-pixels of the second sub-pixel row are respectively disposed between the sub-pixels of the first sub-pixel row such that the sub-pixels of the first sub-pixel row and the sub-pixels of the second sub-pixel row are in a staggered arrangement.

8. The display panel as claimed in claim 1, further comprising a plurality of first data lines overlaps with an area of the sub-pixels of the first sub-pixel row.

9. The display panel as claimed in claim 8, wherein the area of the sub-pixels of the first sub-pixel row where the first data lines overlaps with, corresponds to a liquid crystal shadow area.

10. The display panel as claimed in claim 8, further comprising a plurality of second data lines overlaps with an area of the sub-pixels of the second sub-pixel row.

11. The display panel as claimed in claim 10, wherein the area of the sub-pixels of the second sub-pixel row where the second data lines overlaps with, corresponds to a liquid crystal shadow area.

12. The display panel as claimed in claim 10, further comprising a plurality of driving devices, wherein each of the driving devices simultaneously controls one first data line and one second data line.

13. The display panel as claimed in claim 8, wherein the scan line overlaps with the edges of the sub-pixels of the first sub-pixel row and is vertical to the first data lines.

14. The display panel as claimed in claim 1, further comprising a plurality of common electrodes disposed on edges of the sub-pixels of the first sub-pixel row and the second sub-pixel row.

15. The display panel as claimed in claim 14, wherein the common electrodes are zigzag or concavo-convex.

16. The display panel as claimed in claim 1, wherein the scan line overlaps with a center of the sub-pixels of the second sub-pixel row.

17. The display panel as claimed in claim 1, further comprising a plurality of driving transistors electrically connected to the sub-pixels of the first sub-pixel row and disposed between the two adjacent sub-pixels of the second sub-pixel row.

18. An electronic device incorporating a display panel, the display panel comprising:
   a first sub-pixel row comprising a plurality of sub-pixels electrically connecting to a scan line; and
   a second sub-pixel row comprising a plurality of sub-pixels, wherein the scan line overlaps with an area of the sub-pixels of the second sub-pixel row, and the scan line overlaps with an edge of a first sub-pixel of the sub-pixels of the first sub-pixel row, wherein the edge is adjacent to a driving transistor of the first sub-pixel.

19. The electronic device as claimed in claim 18, wherein the scan line overlaps with an area of a pixel electrode of the sub-pixels of the second sub-pixel row.

20. The electronic device as claimed in claim 19, wherein the scan line overlaps with an edge of a pixel electrode of the first sub-pixel.

* * * * *